United States Patent [19]

Kulka

[11] 3,942,306
[45] Mar. 9, 1976

[54] ANIMAL NOISE PROTECTION DEVICES
[76] Inventor: Helen C. Kulka, 200 Film Bldg., Cleveland, Ohio 44114
[22] Filed: Apr. 8, 1974
[21] Appl. No.: 458,882

[52] U.S. Cl. .................. 54/80; 119/19; 119/106
[51] Int. Cl.² ........................................ B68C 5/00
[58] Field of Search ........ 119/106, 104, 143; 54/79, 54/80

[56] References Cited
UNITED STATES PATENTS
| 584,947 | 6/1897 | Lundborg | 119/104 |
| 785,021 | 3/1905 | Reid et al. | 54/79 |
| 2,136,115 | 11/1938 | McCaleb | 54/80 |

Primary Examiner—Hugh R. Chamblee
Attorney, Agent, or Firm—Donald D. Jeffery

[57] ABSTRACT

Animal noise protection devices of various forms are provided for insulating the animal from environmental noise. In certain forms, an enclosure for the animal is constructed of sound insulation material, with means in the form of hinged doors being provided for permitting ingress and egress of the animal to and from the shelter. Other type devices comprise a collar harness or head band for the animal which encircles at least the ears of the animal and is formed by or has associated therewith sound insulation material.

7 Claims, 10 Drawing Figures

ANIMAL NOISE PROTECTION DEVICES

BACKGROUND OF THE INVENTION

The present invention relates as indicated to animal noise protection devices and relates more particularly to such devices which are suitable for protecting a domestic pet such as a dog from loud and/or sudden noises occurring in the proximity of the animal.

It is common knowledge that many household pets, and particularly dogs, are extremely sensitive to loud and sudden noises which occur near the dog. The problem of noise pollution is a constantly increasing one due not only to technological advances which are frequently noise-producing but the greater concentration of people within a particular area. Typical noises which are bothersome to household pets such as dogs include noises arising within the home caused by noise-generating appliances, the slamming of doors, and even loud conversations. Noises occuring outside the home to which dogs and other pets are commonly subjected include vehicular traffic, construction work and the like, not to mention the sound of gun fire where the habitat of the pet permits hunting or the discharge of guns.

The consideration of the above problems led to the invention disclosed in my earlier filed, pending application Ser. No. 339,372, filed Mar. 8, 1973, entitled "Animal Shelter". Although the shelter disclosed and claimed in my earlier application is completely satisfactory for the purposes intended, other noise protection devices for animals such as dogs have occurred to me since my earlier invention, and it is to these additional devices which the present application relates.

SUMMARY OF THE INVENTION

It is therefore a primary object of the present invention to provide noise protection devices which can be used either to suitably house a variety of domestic pets or which can be placed on and worn by such pets to provide protection for these pets from noises which occur in the vicinity of the pet.

A further, more specific object of the invention is to provide a pet shelter of various type constructions, all of which are extremely simple in construction and formed of lightweight and noise-resistant materials. In all the forms of pet shelters in accordance with the present invention, these shelters can be employed either in a fixed or stationary position or, due to their portability, can be easily moved from place to place.

A further object of the present invention is to provide such shelter and protection devices which combine the effects of both sound and heat insulation. The devices thereby serve to protect the pet from naturally occurring environmental elements such as wind, rain and cold weather, while at the same time providing noise protection as indicated.

In accordance with the invention, various forms of pet shelters are provided which completely house and thus shelter the dog, with means being provided in each instance for movement of the pet into and out of the shelter. In accordance with other forms of the invention, the noise-protection devices take the form of collars or caps which are adapted to enclose the neck and/or head of the pet, and particularly its ears, so as to protect the same against environmental noises. These latter devices too can be provided with heat insulating material to serve the dual purpose of providing both sound and heat insulation for the animal.

These and other objects and advantages of the present invention will become apparent from the following detailed description of the invention, in which particular references is made to the application drawings.

BRIEF DESCRIPTION OF THE APPLICATION DRAWINGSS

DETAILED DESCRIPTION OF THE PREFERRED EMBODIMENTS

Figure 1:
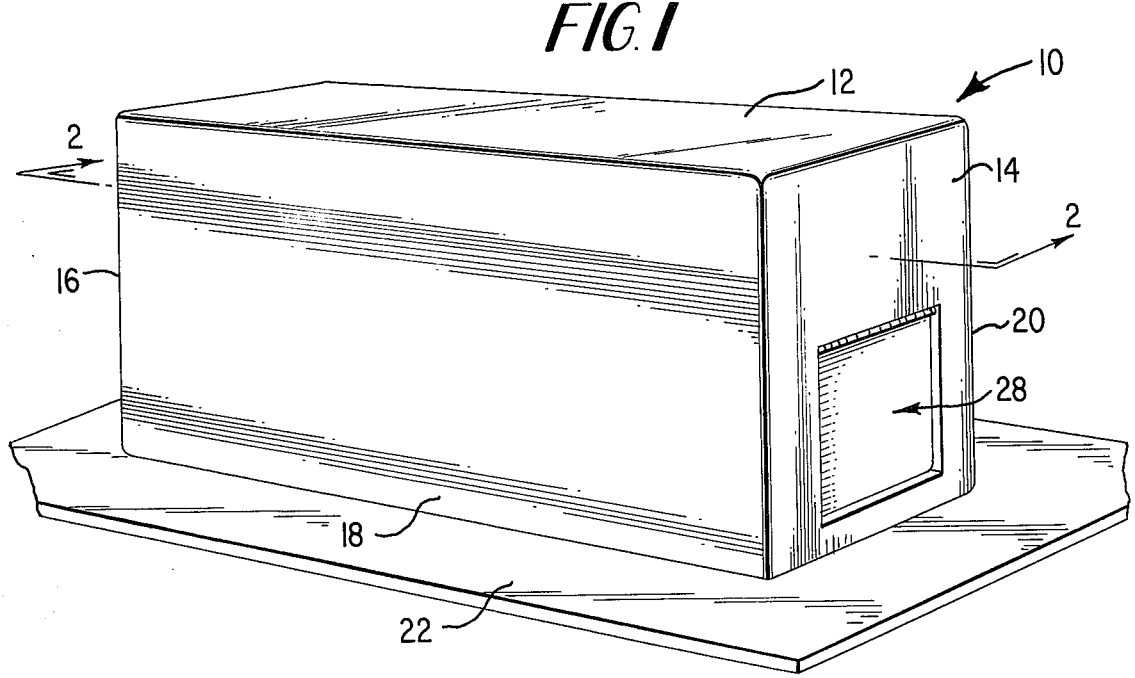
FIG. 1 is a respective view of one form of pet shelter constructed in accordance with the present invention.
Figure 2:
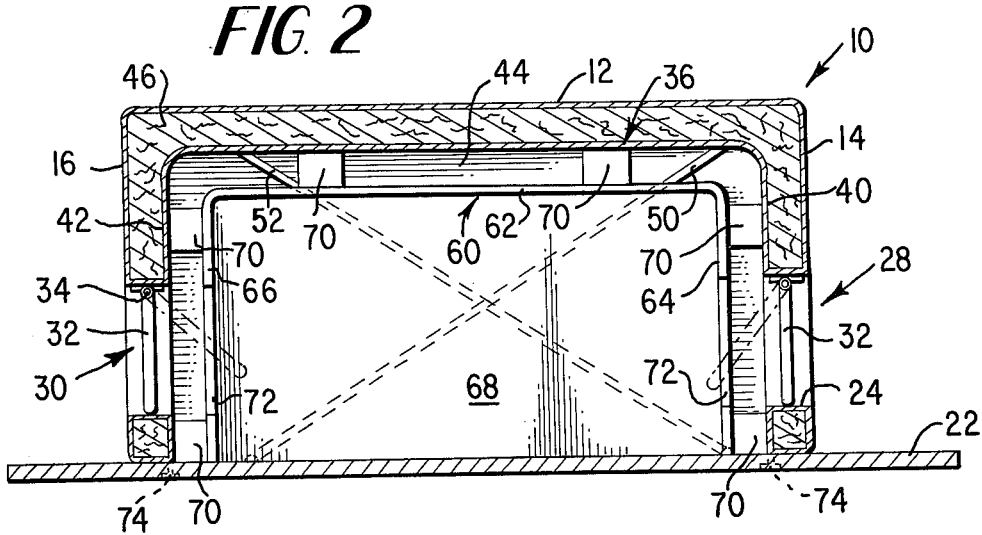
FIG. 2 is a sectional view taken on line 2—2 of FIG. 1.
Figure 3:
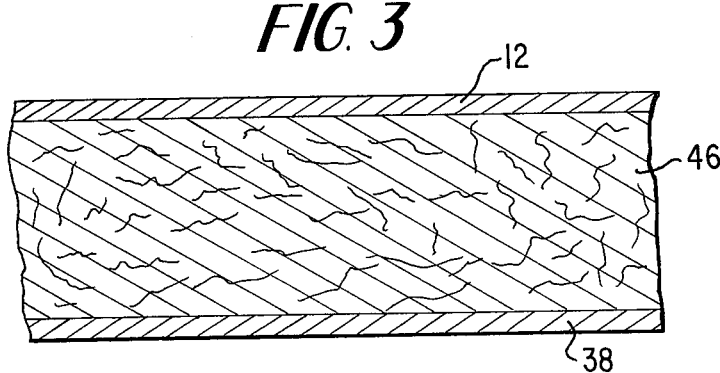
FIG. 3 is an enlarged sectional view through a wall of the pet shelter constructed in accordance with FIGS. 1 and 2.

Referring now in more detail to the drawings, wherein like parts have been indicated by like reference numerals, and initially to the form of the invention illustrated in FIGS. 1–3, the animal shelter is generally indicated at 10 and comprises top wall 12, end walls 14 and 16, and side walls 18 and 20, all of which are integrally formed and preferably molded of a high density foam plastic material, such a styrofoam, polyethylene foam, polyurethane foam or similar high density, relatively low weight plastic materials. The shelter 10 is open at the bottom, and the shelter is adapted to be secured to a base member 22 which forms the floor of the shelter when the assembly is completed.

The end walls 14 and 16 of the shelter are formed with openings 24 and 26, respectively, and mounted in the openings are swinging door assemblies generally indicated at 28 and 30, respectively. Each assembly 28 and 30 includes a door commonly designated at 32 which is pivotally mounted about the axis of a hinge 34 forming part of the assembly. The doors swing both outwardly and inwardly thereby permitting ingress and egress from the shelter by the pet at either end thereof. The doors normally hang vertically thereby providing a fully enclosed housing for the animal.

Mounted within the outer walls of the shelter in spaced relation thereto is an inner supporting wall structure generally indicated at 36 which includes a top wall 38, end walls 40 and 42, and side walls 44, only one of which is visible in FIG. 2. The inner supporting walls may likewise be molded of high density foam plastic material of the types referred to above with respect to the outer wall structure.

Disposed between the inner and outer walls is a sound barrier and absorbing material 46, with such material serving not only to provide the desired noise barrier for animals within the shelter but also serving to uniformly space the inner and outer walls of the structure. The material 46 can be of any satisfactory material for the purpose intended, including wool, cotton, felt, plastic fibers, foam rubber or plastic, or a relatively recently introduced noise abatement material sold under the trademark Feltmetal by Brunswick Corporation, Skokie, Illinois. The last mentioned material is an acoustical product characterized by the inclusion of sintered aggregates of metal fibers in an acoustical matrix material, and is specifically designed for sound absorption. Although the material 46 can constitute any of the above noted materials, it will also be understood that various combinations of these materials can be used as well.

In addition to the above noted materials which can be used for the outer and inner walls 12-20 and 38-44 of the shelter housing, other suitable materials may also be used, such as steel, aluminum, leaded vinyl, and fiberglass, with certain of these materials being inherently weatherproof. Where the materials used in the outer wall construction are not weatherproof, a suitable coating can be sprayed on and adhered to the outer surface of the walls, for example, a metallic powder coating, to provie the desired water-proofing characteristics.

The inner supporting structure 36 is internally rigidified by bracing in the form of braces 50 and 52 which are secured inn any suitable manner to at least the side walls 44 of the inner structure to rigidify the same. Only one set of such braces is shown in FIG. 2, and it will be understood that a similar pair is provided on the opposed side wall, and such bracing may be provided as well on the end walls 40 and 42 if further rigidification is necessary or desirable.

Positioned within the inner supporting frame 36 is the actual shelter for the dog, which shelter is generally indicated at 60. The shelter 60 includes top wall 62, end walls 64 and 66, and side walls 68, all of which are integrally joined to form a structure comparable in shape but smaller in dimension than the inner supporting structure 36. The shelter 60 is positioned within the inner supporting structure 36 and uniformly spaced relation by means of spacing blocks commonly designated at 70 between the top, side and end walls of the shelter and the enclosed structure. The spacing blocks serve not only to uniformly space the shelter 60 form the enclosed walls but also provide therebetween an insulating space which serves to enhance the sound barrier characteristics of the unit. The inner shelter 60 can be formed of the same materials mentioned above with respect to the walls which form the outer enclosure, and the sound barrier and possibly heat insulation characteristics of the inner shelter 60 serve further to enhance protection of the animal from environmental noises and adverse weather. The spacing blocks 70 may likewise be formed of insulating materials.

The end walls 64 and 66 of the shelter 60 are formed with openings commonly designated at 72 which are aligned with the openings 24 and 26 formed in the end walls of the outer enclosure to permit the doors 32 to swing inwardly of the unit for ingress into the unit.

The inner shelter 60 is preferably rigidly connected to the supporting walls 36, and this can be accomplished by interconnecting the adjacent walls to the spacing blocks 70, although it will be understood that other fastening means can as well be employed.

The animal shelter thus described is portable and self-contained and can be simply positioned on the ground or on a base member such as base 22. If a permanent connection of the shelter with the base 22 is desired, suitable fasteners commonly designated at 74 can be provided which extend through the base 22 for connecting to the inner supporting frame 36. If desired, the connection can be accomplished through the braces 50 and 52, which can extend through openings provided therefore in the base 22 for suitable connection to locking nuts or the like. In the form shown, the base 22 is somewhat enlarged relative to the outside dimensions of the shelter 10, although the actual dimensions of the base can be selected as desired. The base 22 can be constructed of any suitable materials, and this member too is preferably waterproof.

Figure 4:
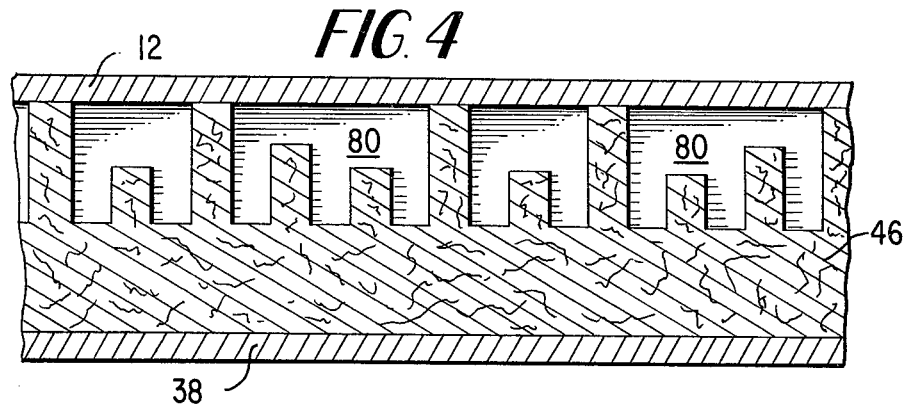
FIG. 4 is a sectional view similar to FIG. 3, showing an alternative form of wall construction of the pet shelter of FIGS. 1 and 2.

Referring to FIG. 4, there is illustrated therein an alternative form of outer wall construction for the shelter 10. The outer wall 12 and inner supporting wall 38 can be formed of the same materials above described, as can be the insulating material 46 disposed therebetween. However, in this form of the invention, the layer 46 is formed with air spaces or pockets commonly designated at 80 for insulating effect. The pocket 80 permit a reduction in the amount of insulating material required without, however, significantly reducing the noise or heat insulation characteristics of the composite wall structure.

Figure 5:
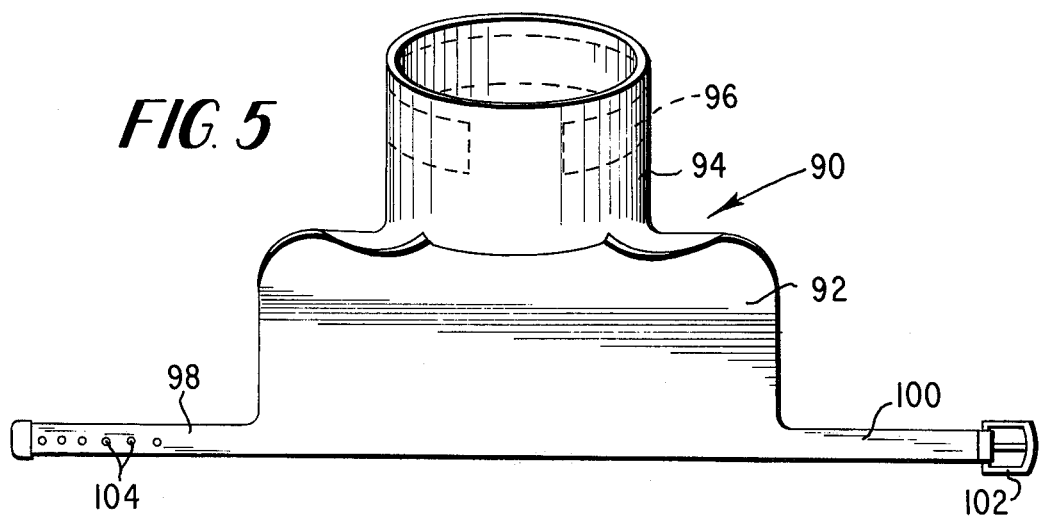
FIG. 5 is a front elevational view of a further form of the invention comprising a collar harness which fits around the shoulders, neck and ears of the pet to provide noise insulation.

Referring now to FIG. 5, there is illustrated therein a collar harness generally indicated at 90 which includes a main body portion 92 which can be extended to an essentially flat condition, and a collar 94 integrally secured to the main body portion 92 and extending upwardly therefrom. Embedded within the collar 94 is a strip 96 of sound barrier material to protect the animal against environmental noises. Extending from the lateral edges of the main body portion 92 are straps 98 and 100, with the latter carrying at its outer end a buckle 102 for selective connection to the strap 98 through openings 104 formed in the latter, in the same manner as a belt.

In the use of the collar harness 90, the main body portion is placed around the shoulders and neck of the animal, with the collar 94 enclosing part of the head of the animal, with the collar 94 enclosing part of the head of the animal, particularly the ears. In order to facilitate use of the harness with various size animals, the material which forms a collar 94 is preferably expansible, for example a woven or knit textile fabric, as is the strip 96 of sound barrier material embedded within the collar. Ideally, the strip 96 overlies the ears of the animal thereby providing the desired protection against environmental noises. When the collar has been positioned as described, the harness can be secured to the animal through the fastening of straps 98 and 100.

Figure 6:
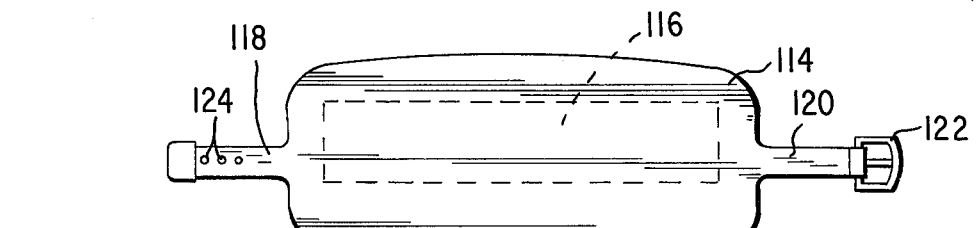
FIG. 6 is a front elevational view similar to FIG. 5 showing a modified form of collar harness.
Figure 6:
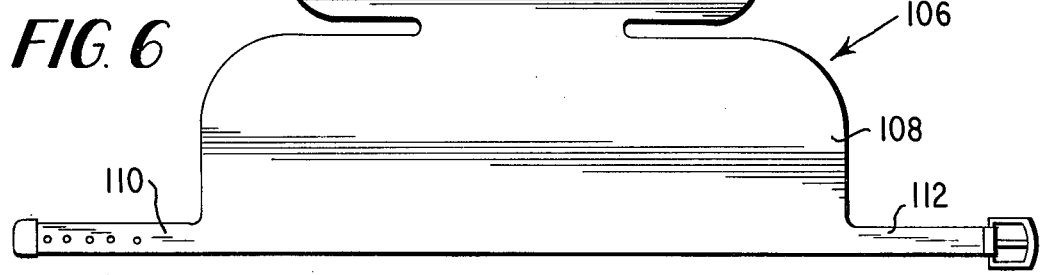

Referring to FIG. 6, the collar harness is generally indicated at 106 and is similar in certain respects to the collar harness shown in FIG. 5, being formed with a main body portion 108 and connecting straps 110 and 112. However, in the FIG. 6 form, the collar portion 114 of the harness is flat when fully extended rather than closed as in the FIG. 5 form. Embedded within the collar portion 114 is a strip 116 of sound barrier material as above described, and extending from the lateral edges of the collar portion 114 are straps 118 and 120, with the latter having a buckle 122 carried at its outer end, and the strap 118 being formed with openings 124 to receive the buckle.

The collar harness 106 is applied in essentially the same manner as the harness 90, except that the collar portion 114 is retained in position enclosing the head of the animal by means of the buckle 122. The collar portion 114 as well as the strip 116 are preferably formed of expansible material to permit use of the harness with various size pets. When the harness is applied, the dog is protected against environmental noises, with the collar in addition providing some protection against climatic conditions.

Figure 7:
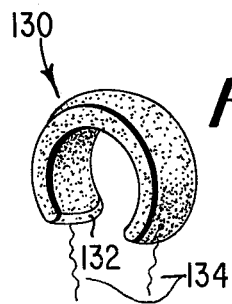
FIG. 7 is a cap-like noise protection device which can be disposed around the head ears of the pet.

Referring to FIG. 7, there is illustrated therein a headband generally indicated at 130 which is generally cylindrical in cross section and open at one side thereof as shown in 132 to facilitate positioning the same around the head of the animal, particularly the ears. Tie strings commonly designated at 134 are secured to an extend from the headband for tieing the band around the neck of the animal after the same has ben secured in place.

The band 130 can be formed entirely of sound barrier material of the type described above, or can be formed of a suitable natural or synthetic textile material, with sound barrier material embedded therein.

Figure 8:
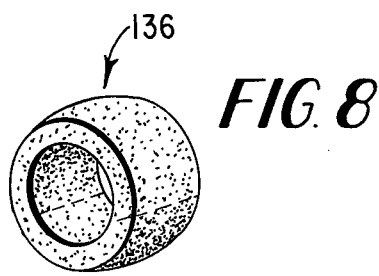
FIG. 8 is a device similar to FIG. 7 only in closed, cylindrical form.

There is illustrated in FIG. 8 an alternative form of headband, generally indicated at 136. This form of band is cylindrical and comprised entirely of sound barrier material or of other suitable materials in which the sound barrier material is embedded. The material is preferably elastic or provided with embedded elastic material in order to permit use of the band with various size animals. As in the FIG. 7 form, the collar 136 in use is placed over the head of the animal, and particularly over the ears to provide the desired protection against environmental noise.

Figure 9:
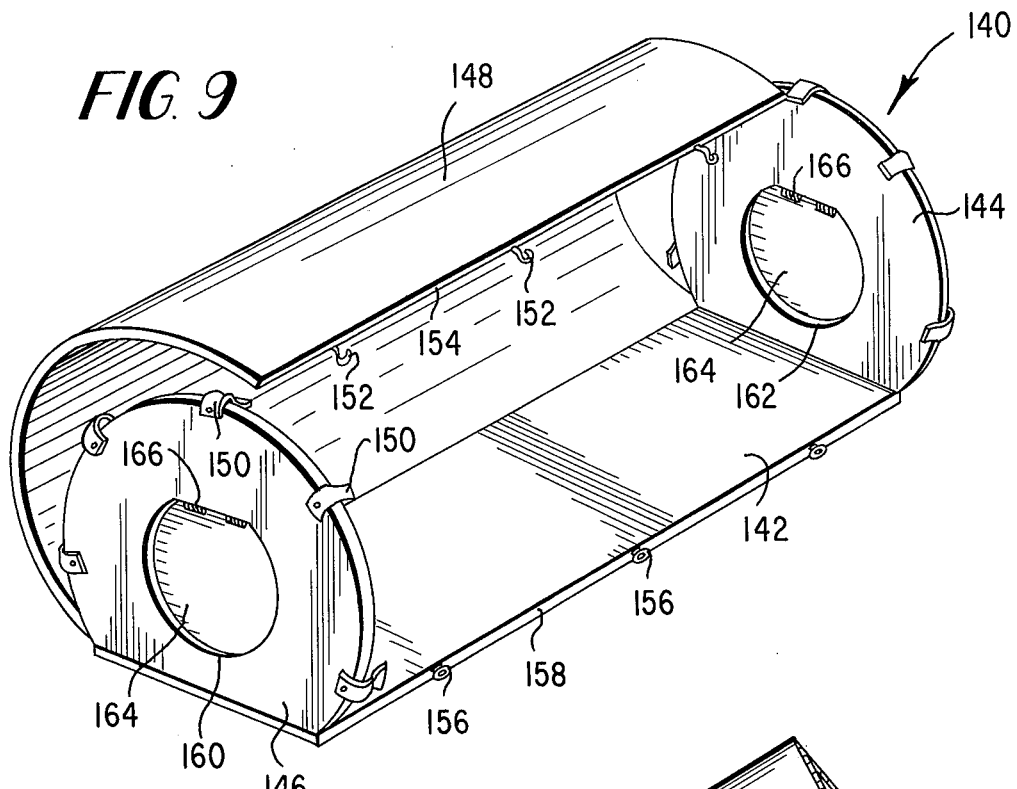
FIG. 9 is a perspective view of a modified form of pet shelter, with the covering portion thereof shown detatched from the end sections of the shelter to which is adapted to be connected.

Referring to FIG. 9, an alternative form of animal shelter or enclosure is generally indicated at 140 and includes a base 142 and generally circular end sections 144 and 146 rigidly secured to the base and extending upwardly generally perpendicular thereto. A separate top enclosure member 148 is provided one end of which is secured to one side of the base 142 as illustrated. The enclosure 148 is otherwise entirely separate from the base and ends and is adapted to be operatively connected thereto by means of clip members commonly designated at 150 connected to the ends 144 and 146, and clips commonly designated at 152 attached to the free end 154 of the enclosure member. The male clip members 152 are adapted to engage stud-like fasteners commonly designated at 156 mounted on and extending laterally from the side edge 158 of the base member, with the members 156 being equal in number to and aligned with the male fasteners 152.

The top enclosure member 148 is shown detached in FIG. 9 to permit cleaning of the shelter, and it will be understood that to reassemble the shelter, the top enclosure member 148 is pulled toward the side edge 158 of the base 142, and the male fasteners 152 fastened to the fastening members 156 provided on the base. In such position, the outside surface of the top enclosure member will be generally aligned with the top surface of the end walls 144 and 146, after which the clips 150 can be positioned over the top enclosure member thereby retaining the same in place.

Openings 160 and 162 are formed in the end walls 146 and 144, respectively, and doors commonly designated at 164 are mounted in such openings and hinged to the end walls by hinges commonly indicated at 166. The hinges are constructed and arranged to permit swinging of the doors inwardly or outwardly thereby permitting ingress or egress from the shelter at either end thereof.

The base 142, end walls 144 and 146, and top enclosure member 148 are formed of sound barrier material of the type referred to above and, if desired, the exteriorly exposed surfaces of the shelter can be provided with weatherproofing material.

Figure 10:
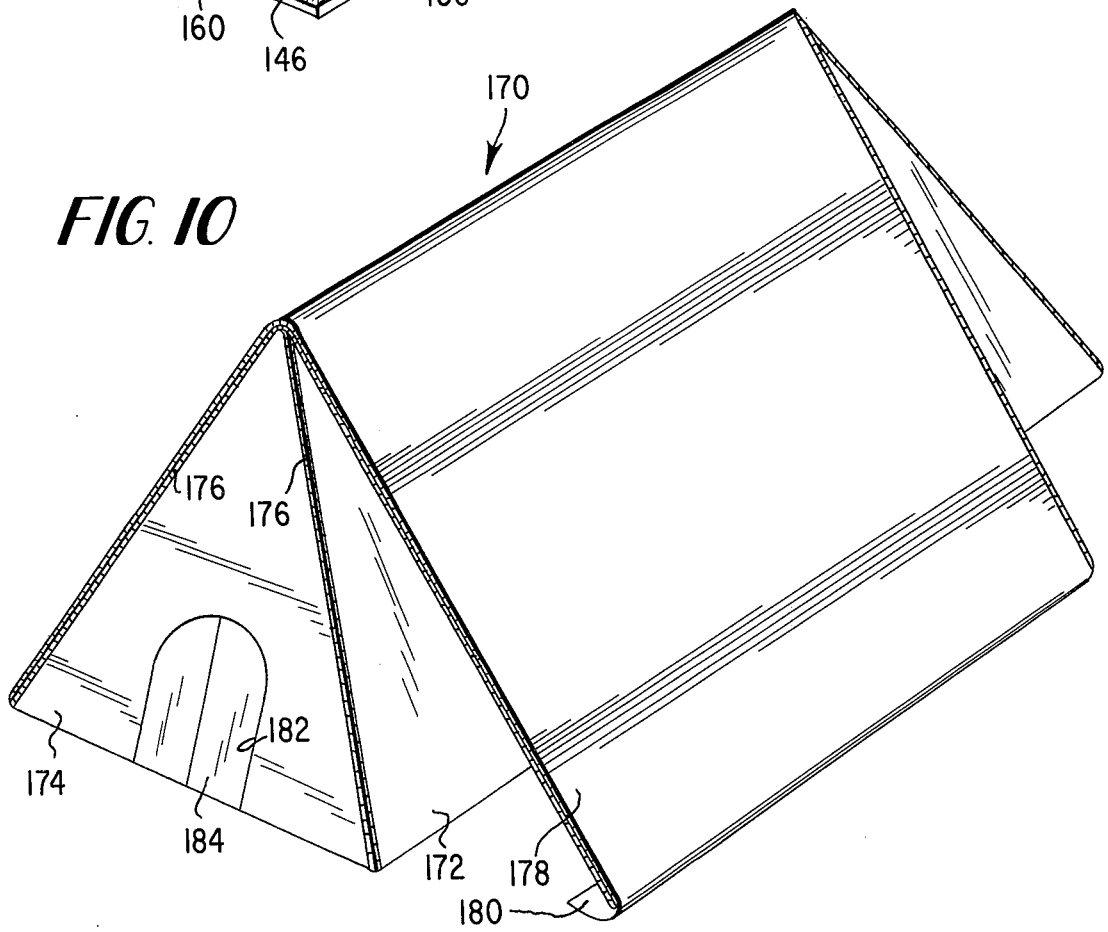
FIG. 10 is a perspective view of a still further modified form of pet shelter constructed in accordance with the present invention.

Referring to FIG. 10, there is illustrated therein a tent-like animal shelter generally indicated at 170 which includes side walls 172, only one of which is visible in FIG. 10, and end walls 174. The side and end walls can be interconnected in any suitable manner such as, for example, by zippers commonly indicated at 176 provided at the adjoining corners of the walls.

A side flap 178 is provided in the form shown, which in this instance is integrally formed with the opposed side wall of the shelter to provide an outside sheltered area adjacent the adjoining side wall. The flap 178 is formed with a bottom flange 180 which can if desired be tucked under the adjacent side wall 172.

Both the walls and the flap 178 of the shelter 170 are formed of sound barrier material so as to provide the necessary protection against environmental noise, and the exteriorly exposed surfaces of the enclosure are preferably made waterproof.

Each end wall 174 of the shelter is formed with an opening 182 in which is mounted a closure member 184 which can, for example, be formed by the same material and provided in two sections each of which is secured along the outer edge thereof to the material forming the opening 182. The sections are spaced centrally of the opening and the animal can enter the enclosure simply by forcing the sections either inwardly or outwardly as the animal enters or leaves the shelter.

It will be understood that changes can be made from the foregoing description without, however, departing from the spirit of the invention. For example, the animal shelter shown in FIGS. 1–3 could be modified so that the outer housing is formed of a single sound insulating material of uniform thickness throughout, rather than the spaced inner and outer wall construction as shown between which the sound insulating material is positioned. Any of the materials above described could be used for such purpose, and the inner shelter would be spaced in the same manner from the outer one-piece housing. The exterior walls of the one-piece housing could be provided with a protective coating as described for weather proofing purposes.

I claim:

1. An animal noise protection device suitable for protecting the animal from environmental noises comprising means for encircling at least part of the head of the animal, particularly the ears, said means comprising a collar harness having a main portion which is flat when unfolded and which is adapted to extend around the shoulders of the animal, and means at the lower end of said main portion of said harness for securing the same in place, and an upper, head encircling portion integral with said main portion and adapted to partially encircle the head and particularly the ears of the animal, and sound insulation material embedded in said upper part of said harness to protect the animal from environmental noises.

2. The noise protection device of claim 1 wherein said upper end of said harness is cylindrical in form.

3. The animal noise protection device of claim 1 wherein said upper portion of said harness is essentially flat when unfolded and is provided with cooperative strap means at the lateral edges thereof for removably securing said upper portion in a position encircling a part of the head of the animal.

4. The animal noise protection device of claim 1, wherein said collar harness is formed of textile fabric having embedded therein a strip of sound barrier material, said strip when said collar harness is in place being disposed over the ears of the animal.

5. An animal noise protection device suitable for protecting the animal from environmental noises comprising a head band for encircling the ears of an animal, said head band being comprised of sound insulating material, and means for removably retaining said band in a position encircling the head of the animal.

6. The noise protection device of claim 5 wherein said head band is partially cylindrical and provided with means carried by said band for retaining said band in place around the ears of said animal.

7. The noise protection device of claim 5 wherein said head band is cylindrical and provided with elastic means embedded therein for retention of said band around ears of said animal.

* * * * *